Patented Mar. 7, 1944

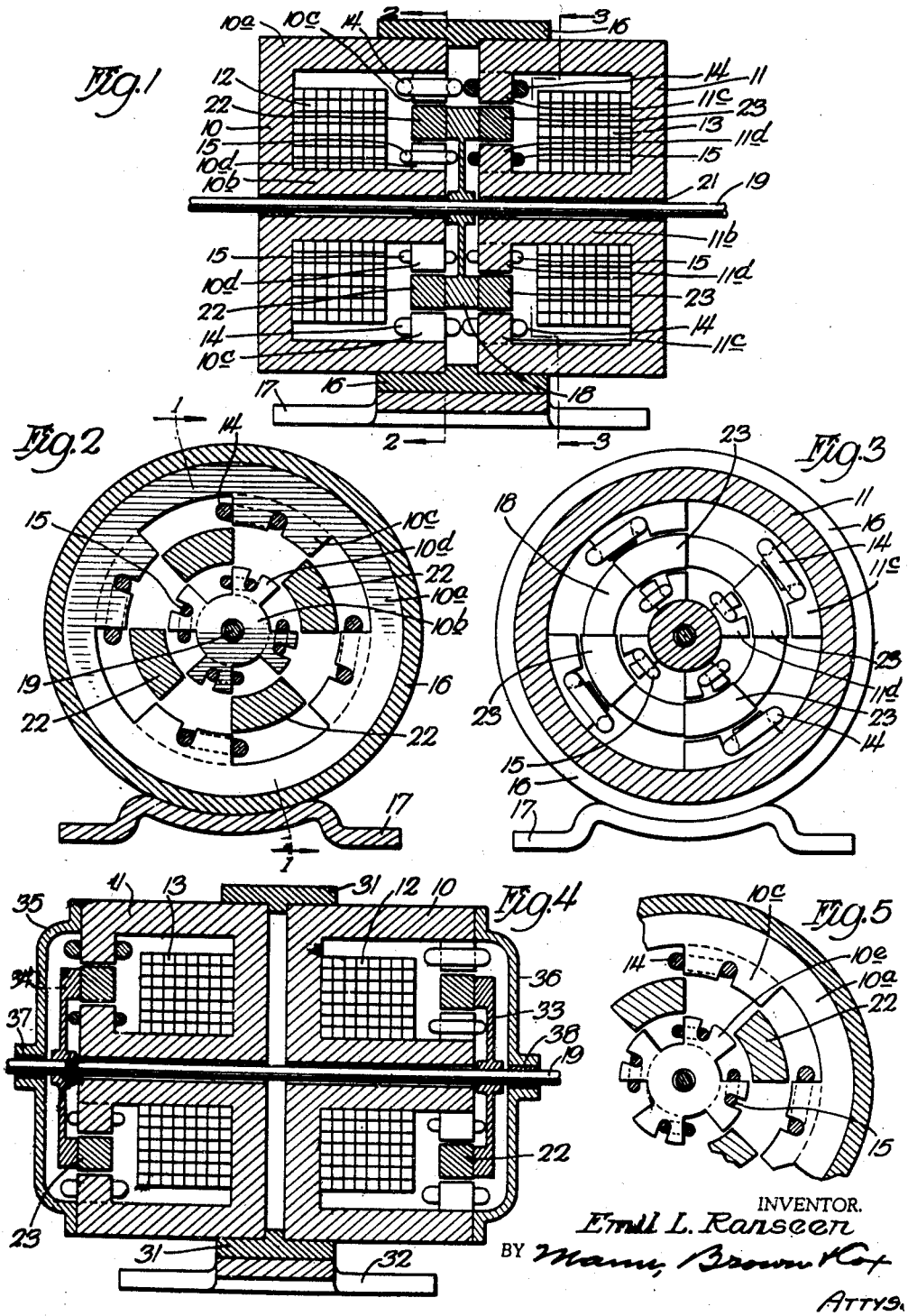

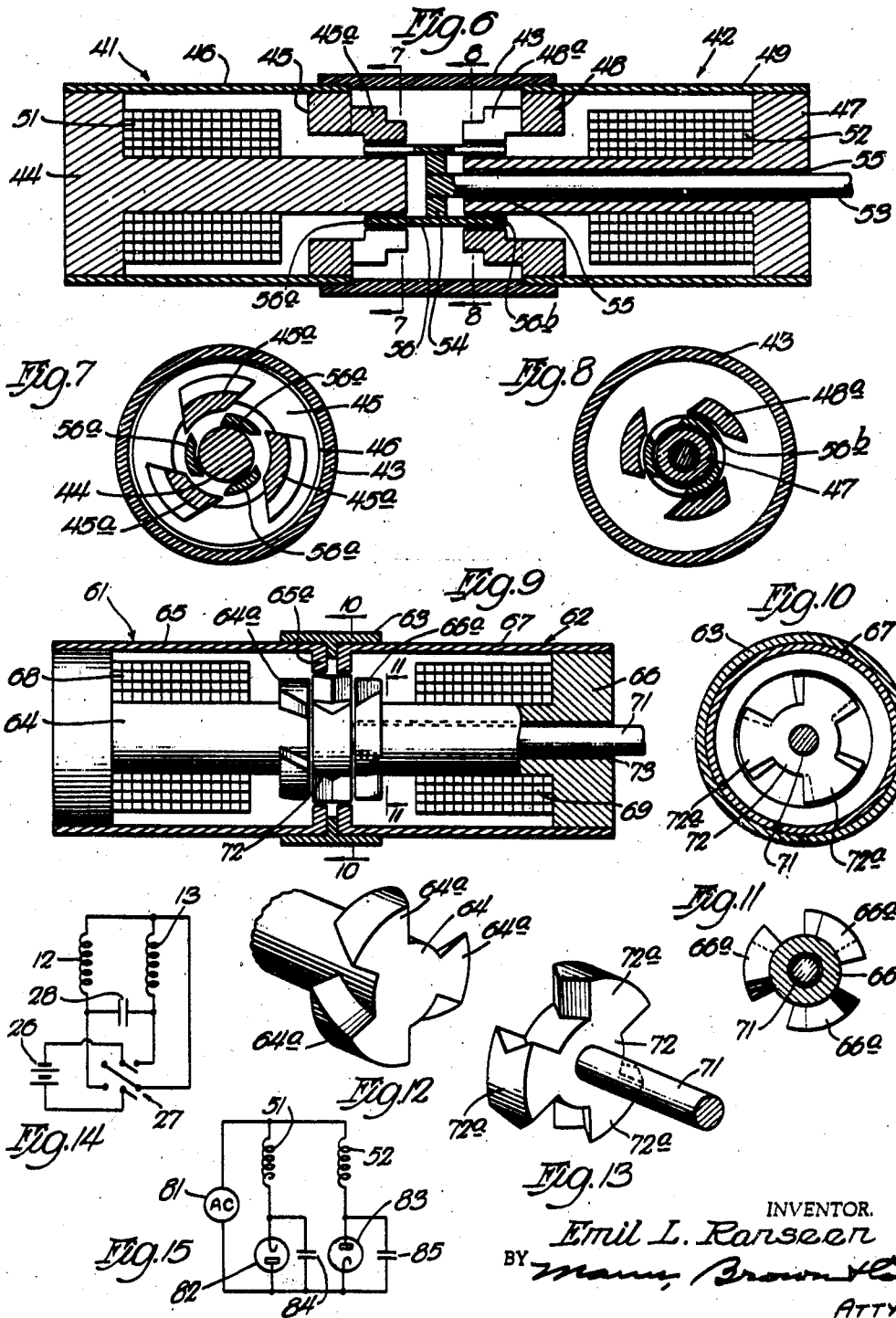

2,343,325

UNITED STATES PATENT OFFICE 2,343,325

ELECTRIC IMPULSE MOTOR

Emil L. Ranseen, Chicago, Ill.

Application March 14, 1942, Serial No. 434,737

20 Claims. (Cl. 172—36)

This invention relates to electric motors and particularly to electric motors of small and medium size for use where it is desired to control accurately the rotation of a member to be driven by the motor.

One of the principal objects of the invention is to provide an electric motor adapted to be driven by separate electric impulses and so constructed that each impulse causes the motor to turn a predetermined amount. If the total number of impulses is controlled, the position to which the motor turns will be determined, and it may be used in statistical machinery, automatic switching gear of various types, remote control or signaling apparatus, and in many types of devices requiring intermittent movements. If the rate of the impulses is controlled, the speed of the motor will be determined, and it may be used in operating parts in synchronism with each other or in devices requiring different rates of movement, such as in feeding work in a machine or tools to a work piece.

Another object of the invention is to provide an electric impulse motor having a substantially closed magnetic circuit, so that its efficiency will be high, and having a multiplicity of pole pieces, so that the torque generated by the motor will be high and so that the motor will be capable of relatively accurate angular movements.

Another object of the invention is to provide an electric impulse motor that has few parts and that is simple and economical to manufacture.

Another object of the invention is to provide an electric impulse motor having a minimum of moving parts and no reciprocating members, so that it will operate smoothly and reliably and without noise or excessive wear.

Other objects and advantages of the invention will be apparent from the following description and the accompanying drawings, in which Fig. 1 is a longitudinal sectional view of one of the preferred forms of the invention, the section being taken on the line 1—1 of Fig. 2, looking in the direction of the arrows;

Fig. 2 is a cross section on the line 2—2 of Fig. 1, looking in the direction of the arrows;

Fig. 3 is a cross section on the line 3—3 of Fig. 1, looking in the direction of the arrows;

Fig. 4 is a longitudinal sectional view similar to Fig. 1, but showing another form of the invention;

Fig. 5 is a partial cross section similar to Fig. 2, but showing a third form of the invention;

Fig. 6 is a longitudinal sectional view similar to Fig. 1, but showing a fourth form of the invention;

Fig. 7 is a cross section on the line 7—7 of Fig. 6, looking in the direction of the arrows;

Fig. 8 is a cross section on the line 8—8 of Fig. 6, looking in the direction of the arrows;

Fig. 9 is a longitudinal sectional view similar to Fig. 1, but showing a fifth form of the invention;

Fig. 10 is a cross section on the line 10—10 of Fig. 9, looking in the direction of the arrows;

Fig. 11 is a cross section on the line 11—11 of Fig. 9, looking in the direction of the arrows;

Fig. 12 is a perspective view of a portion of the form of the invention shown in Fig. 9;

Fig. 13 is a perspective view of another portion of the form of invention shown in Fig. 9;

Fig. 14 is a diagram of an electric circuit which may be used with any of the forms of the invention shown in Figs. 1 to 13; and Fig. 15 is a diagram of another electric circuit which may be used with any of the forms of the invention shown in Figs. 1 to 13.

The particular form of the invention shown in Figs. 1 to 3 comprises a pair of similar stator members, 10 and 11, provided with electric windings or coils 12 and 13 and functioning as field magnets. The stator member 10 comprises a cup-like outer pole portion 10a and a central stem or inner pole portion 10b. The outer pole portion or rim of the stator member 10 is formed with four inwardly projecting poles 10c, and the end of the inner pole portion or stem 10b of the stator member is formed with four outwardly projecting poles 10d, the poles 10c and 10d on the inner and outer pole portions 10a and 10b of the field member being directly opposite each other, as shown in Fig. 2.

Each of the outer poles 10c is formed with a central slot through which passes a heavy short-circuited turn of copper wire 14, which encircles one-half of the pole 10c. Similarly, each of the inner poles 10d is formed with a slot through which passes a heavy short-circuited turn of copper wire 15 which encircles one-half of the pole 10d. The poles 10c and 10d are thus "shaded" so that when an electric current starts to flow through the field coil 12 and the field magnet 10 is magnetized, the magnetic flux will, at first, pass from one pole 10c to the other pole 10d through those portions of the poles which are not encircled by the shading coils 14 and 15. However, as the current continues to flow through the field coil 12, the lines of magnetic flux will distribute themselves evenly over the faces of the poles 10c and 10d. Later, when the current ceases to flow in the field coil 12, and the lines of magnetic flux die out, they will die out first between those portions of the poles 10c and 10d which are not encircled by the shading coils 14 and 15. The purpose of this is explained below.

The field magnets or stator members 10 and 11 have been shown and described as if each were formed of a single piece of metal, but it will, of course, be understood that each member 10 and 11 may be built up of several pieces or, preferably, of many laminations, like the laminations used in the magnetic portions of many types of electrical equipment, and that these pieces or laminations are to be made of suitable magnetizable material, such as silicon steel. The two field magnets 10 and 11 are secured together by a ring or frame member 16 formed of non-magnetic material, such as bronze or a non-magnetic steel, and the frame member 16 is fixed to a base 17 adapted to rest upon a horizontal surface and form a support for the motor.

The central portions 10b and 11b of the stator members are formed with longitudinal bores through which a rotor shaft 19 extends, and bearings 20 are provided to support the shaft. At the center of the motor, the shaft 19 supports a rotor disc 18 which is keyed to it and which has a plurality of armature pieces 22 and 23 secured to its sides. The armature pieces 22 on one side are located so as to project between the poles 10c and 10d of one field magnet 10, and there are as many such pieces 22 as there are pairs of poles 10c and 10d on the field magnet. The armature pieces 23 on the other side of the rotor disc 18 similarly project between the poles 11c and 11d of the other field magnet 11, as is clearly shown in Fig. 3.

The two field magnets 10 and 11 and the armature pieces 22 and 23 on the rotor are arranged so that, when the armature pieces 23 on one side of the rotor disc 18 lie directly between the poles 11c and 11d of their field magnet 11, as shown in Fig. 3, the armature pieces 22 on the other side of the rotor disc 18 will lie directly between the gaps between the outer poles 10c and the gaps between the inner poles 10d of the other field magnet 10. This arrangement may be provided either by having the armature pieces 23 on one side of the rotor disc 18 angularly offset from the armature pieces 22 on the other side, or by having one field magnet angularly offset from the other; the latter arrangement is the one used in the particular motor shown in the drawings.

The rotor disc 18 and the armature pieces 22 and 23 may be made of a single piece of magnetizable material, such as soft iron, but for some purposes, it may be preferable to make the rotor disc 18 of non-magnetic material and to make each of the armature pieces 22 and 23 of some strongly magnetizable metal, such as "Alnico," and to magnetize the armature pieces so that their radially inner faces have one polarity and their radially outer faces have the opposite polarity.

The motor shown in Figs. 1 to 3 and described above is incomplete without a suitable operating circuit. One such circuit is shown in Fig. 14, this circuit being extremely simple and serving chiefly as an illustration of the type of circuit necessary. This circuit comprises a source of direct current 26, which may be a battery, a two-pole, two-throw switch 27 arranged to connect the battery 26 alternately to the field coils 12 and 13, and a condenser 28 connected between the two field coils. When the switch 27 is thrown in one direction, the current flows from the battery 26 through the field coil 12, energizing the field magnet 10 and causing magnetic flux to flow between the poles 10c and 10d of that magnet. The flux thus created draws the armature pieces 22 from the positions shown in Fig. 2 to positions directly between the poles 10c and 10d, thus causing the rotor disc 18 which carries the armature pieces to rotate one-eighth of a turn. The direction in which the rotor turns is determined by the location of the shading coils 14 and 15. As explained above, the flux arises first on the unshaded sides of the poles, and these sides, therefore, exert a stronger initial attraction on the armature members 22 than the unshaded sides of the poles. The armature members 22 and the rotor disc will therefore move from the position shown in Fig. 2 in a counter-clockwise direction.

When the switch 27 is thrown in the other direction, current from the battery 26 will cease to flow through the field coil 12 and will flow through the other field coil 13 energizing the other field magnet 11. The armature pieces 23 associated with this field magnet are now located in the same relation to the poles 11c and 11d as were the armature pieces 22 in relation to the poles 10c and 10d of the other field magnet. They will then be drawn into the position shown in Fig. 3 directly between the poles, thus rotating the armature pieces 23 and the rotor another eighth of a turn.

When the switch 27 is thrown from a position in which it passes current through the field coil 12 to the position in which it passes current through the other field coil 13, a small pulse of current will flow through the condenser 28 and the other field coil 12 in the opposite direction to that in which the current was going before. This small pulse of current serves to completely demagnetize the field magnet 10 so that there will be no residual attraction between its poles and the armature pieces cooperating with them. In a similar manner, when the switch 27 is thrown back to its original position, a condenser 28 will cause a small pulse of current to flow through the other field coil 13 with a similar result.

From the above, it may be seen that, as the switch 27 is thrown alternately from one position to the other, the rotor 18 and the armature pieces 22 and 23 connected to it will move one-eighth of a turn each time that the switch is thrown, thus providing a step by step movement in synchronism with the movement of the switch. The switch 27 can, of course, be a manually operated switch, but ordinarily it will be a mechanically driven switch forming a part of an apparatus with which the motor is associated.

The form of the invention shown in part in Fig. 5 is similar to the one shown in Figs. 1 to 3 in that it comprises two field magnets acting alternately on two sets of armature pieces carried on the two sides of a rotor disc and in that all of these parts, except for the poles of the field magnets, are identical with the corresponding parts shown in Figs. 1 to 3. In the construction shown in Figs. 1 to 3, as may be seen in Figs. 2 and 3, the inner poles 10d and 11d of the field magnets have the same angular width as the outer poles 10c and 11c, and both sides of each inner pole 10d or 11d lie in the same axial planes as the sides of the outer pole 10c or 11c opposed to it.

The construction shown in Fig. 5 differs from this in that the inner poles 10e have a greater angular width than the outer poles 10c. The extra width of each inner pole 10e is all on one side of the pole so that that side of the pole 10e projects beyond the plane of the corresponding side of the outer pole 10c opposed to it, while the other sides of the inner and outer poles are aligned.

When the poles 10c and 10e of the construction shown in Fig. 5 are magnetized, lines of magnetic flux will extend between opposite poles, and some of these lines will curve out and pass through the armature pieces 22. However, of the lines of flux extending between any pair of opposite poles 10c and 10e, more will pass through the armature piece 22 located in a clockwise direction from that pair than that through the armature piece 22 located in a counter-clockwise direction, because there is a slight overlap between the inner pole 10e and the armature piece in a clockwise direction from it. Therefore, the force tending to pull this armature piece to a position between the poles will be greater than the force tending to pull the other armature piece to that position, and the armature pieces 22 and the rotor disc and shaft to which they are fixed will turn in a counter-clockwise direction.

In the construction shown in Fig. 5, the shading coils 14 and 15 function as in the other forms of the invention described above and serve to make the armature pieces 22, and the parts to which they are fixed, turn in a counter-clockwise direction. There are thus two factors, the shading coils 14 and 15 and the one-sided excess in angular width of the inner poles, which supplement each other in making the motor turn in the desired direction.

While, in the construction shown in Fig. 5, the inner poles 10e are angularly wider than the outer poles 10c, the opposite construction, with the outer poles angularly wider than the inner poles, may obviously be used. However, improved results will not be secured by making both inner and outer poles wider than in the construction shown in Figs. 1 to 3 because such poles, when magnetized, will not cause the armature pieces 22 to move a full eighth of a turn from the assumed starting position and will thus fail to turn the rotor to the necessary starting position for the next step of its step-by-step rotation.

The form of the invention shown in Fig. 5 is generally similar to that shown in Figs. 1 to 3, but the two stator members or field magnets 10 and 11 are reversed in position so that their poles are at the ends of the motor instead of in the center. The two magnets 10 and 11 are joined together by a non-magnetic frame member 31, which separates them slightly and which is mounted on a base 32 which supports the entire motor assembly.

The ends of the motor are provided with end caps 35 and 36 carrying bearings 37 and 38 in which the shaft 19 is journaled. The end caps 35 and 36 enclose two rotor discs 33 and 34, each of which is similar to half of the single rotor disc 18 in the motor shown in Figs. 1 to 3. Each of the rotor discs 33 and 34 carries a set of armature pieces 22 or 23 secured on one side and projecting between the poles of the associated field magnet 10 or 11. The relation of the armature pieces 22 and 23 to the field magnets 10 and 11 is exactly the same as in the form of the invention shown in Figs. 1 to 3, and the operation of the motor is also the same and need not be described in detail.

In the form of the invention shown in Figs. 6 to 8, the left and right field magnets 41 and 42 are each shown as being built up of several pieces. The left field magnet 41 comprises a central member 44 and a pole piece 45 joined by an outer tubular piece 46, the three members 44, 45 and 46 together forming an assembly somewhat similar to the field magnet 10 shown in Fig. 1, but having separate poles 45a only upon the outer member 45, as clearly shown in Fig. 7. The right field magnet 42 is similarly formed of three pieces 47, 48 and 49, but the inner piece 47 is formed with a longitudinally extending bore through which the shaft 53 of the motor extends, bearings 55 being provided for the shaft. The field magnets 41 and 42 are made of suitable magnetic material and are provided with field coils 51 and 52, and they are joined together by a sleeve or frame member 43 formed of non-magnetic material.

The inner end of the shaft 53 carries a rotor disc 54 upon which is mounted a generally tubular shaped armature member 56. Each end of the armature member 56 is formed with deep rectangular notches so as to leave spaced armature portions 56a and 56b between the notches, the armature portions 56a on one end of the armature member projecting into the gap between the central piece 44 and the outer poles 45a of one field magnet 41, and the armature portions 56b on the other end of the armature member 56 projecting into the gap between the central piece 47 and the outer poles 48a of the other field magnet 42.

As may be seen from Figs. 7 and 8, there are three poles 45a or 48a on each of the outer pole pieces 45 and 48 of the two field magnets, and there are three armature portions 56a or 56b on each end of the armature member 56. The armature portions 56a and 56b on the two ends of the armature member 56 are in line with each other, but the poles 49a on one of the field magnets 42 are angularly offset one-sixth of a turn from the poles 45a on the other field magnet 41. The arrangement thus provided is generally similar to that described above in connection with Figs. 1 to 3, except that there are three sets of poles and cooperating armature portions in each half of the motor instead of four, and the operation of the motor will be generally the same, except that the rotor 54 and armature 56 will turn one-sixth of a turn for each current impulse in the field magnet coils 51 and 52 instead of one-eighth of a turn.

In the form of the invention shown in Figs. 6 to 8, the direction in which the armature member 56 rotates is determined by the shape of the poles 45a and 48a and the shape of the armature portions 56a and 56b rather than by the use of shading coils. As may be seen in Figs. 7 and 8, the sides of the poles 45a and 48a and of the armature portions 56a and 56b are not radial, but lie in planes parallel to and spaced from the axis of the motor. Thus, in Fig. 7, the adjacent corners of each pole piece 45a and of the armature portion 56a which lies in a counter-clockwise direction from it are obtuse, whereas the adjacent corners of each pole 45a and of the adjacent armature portion 56a which lies in a clockwise direction from it are acute. Therefore, more of the flux passing from each pole 45a to the central member 44 of the field magnet will pass through the armature portion 56a which is in a clockwise direction from it than through the armature portion 56a which is in a counter-clockwise direction from it. The forces tending to pull the armature portions 56a in a counter-clockwise direction will therefore be greater than the forces tending to pull them in a clockwise direction, and the armature member 56 will turn in a counter-clockwise direction from the position shown in Fig. 7 to a position in which each armature portion 56a lies directly between one of the poles 45a and the central part 44 of the field magnet. This will turn the armature 56 one-sixth of a turn, and a similar movement will take place when a current impulse passes through the other field magnet coil 52. The armature 56 and the shaft 53 upon which it is mounted will therefore rotate step by step as current is passed alternately through the two field coils 51 and 52.

The motor shown in Figs. 6 to 8 may be employed with the same type of circuit, shown in Fig. 14, that was described above in connection with the first form of the invention, but, for the purpose of illustration, a different circuit has been shown in Fig. 15. In this circuit, each of the two field coils 51 and 52 are connected to a source of alternating current 81 through a rectifier 82 or 83, the two rectifiers 82 and 83 being connected in opposite directions so that current will flow through one rectifier 82 when the alternating current is flowing in one direction and through the other rectifier 83 when the alternating current is flowing in the other direction. Thus current will flow alternately in the two coils 51 and 52. The pulses of current flowing through the rectifiers 82 and 83 will always flow in one direction, so the main current flowing through the two coils 51 and 52 will be unidirectional. However, each rectifier 82 or 83 is by-passed by a condenser 84 or 85, which permits a small pulse of current to flow in the opposite direction through its associated field coil 51 or 52. The small pulses of reverse current remove the residual magnetism from the field magnets so that there will be no tendency to hold the armature member 56 from making the next step in its rotation.

In the form of the invention shown in Figs. 9 to 13, as in the other forms of the invention, the two field magnets 61 and 62 are joined by a non-magnetic frame member 63 which holds them apart so that there will be no appreciable magnetic flux flowing from one field magnet 61 to the other field magnet 62. The left field magnet 61 is formed of a central piece 64 having three radially extending poles 64a on its inner end, and an outer piece 65 having an inwardly directed flange 65a on its inner end. The right field magnet 62 is similarly formed of inner and outer pieces 66 and 67, and each of the two field magnets is provided with a field coil 68 or 69.

The inner pieces 64 and 66 of the two field magnets are spaced from each other, and the space thus provided is occupied by the armature member or rotor 72. The rotor 72 is carried upon a shaft 71 which extends through one of the field magnets 62 and is rotatably supported by bearings 73.

As may be seen in Fig. 12, the poles 64a on the inner end of the inner field magnet member 64 are three in number, and the lateral faces of each pole are oblique to the axis of the member. Thus the face of each pole 64a next to the armature has one obtuse corner and one acute corner. The poles 65a on the inner end of the other inner field magnet member 66 are similarly formed but the lateral faces of the poles of this member slope in the opposite direction, as may be seen in Fig. 9, and the poles of this member 66 are angularly offset with respect to the poles of the other member 64. The armature 72 is similarly formed with three radially projecting armature portions 72a, and the lateral faces of each of the armature portions 72a are each divided into two parts, each of which is oblique to the axis of the armature 72 in the same way as the lateral faces of the poles of the adjacent field magnet. Thus the armature portions 72a will present obtuse corners to the obtuse corners of the poles 64a and 65a of the field magnets and will present acute corners to the acute corners of the poles 64a and 65a of the field magnets, and the direction of rotation of the rotor 72 will be determined in substantially the same way as the direction of rotation of the rotor 54 in the motor shown in Figs. 6 to 8. As anyone skilled in the art would realize, the rotor 72, except for magnetic armature portions 72a, should be non-magnetic, or some other provision made, so that substantially all of the flux will be forced to follow the paths directly between and through armature portions 72a and either set of the pole portions 64a and 66a.

While I have shown and described only five forms of my invention, it will, of course, be understood that these forms have been disclosed by way of example and that the invention can be carried out in many other ways. For example, some of the features shown in one form may be used in another form and various combinations of features may be made, such as using both shading coils and oblique faces on the poles of the field magnets. My invention, therefore, is limited only by the terms of the following claims.

I claim:

1. An electric impulse motor comprising a rotor having a plurality of magnetized armature members spaced around the axis thereof and similarly located with respect to said axis, the two poles of each armature member lying in an axial plane, and a stator having two portions including face portions located on opposite sides of one portion of the path of said armature members and having a single winding for oppositely magnetizing said portions, each of said portions having one pole for each of said armature members and the poles being arranged in pairs lying in the axial planes.

2. An electric impulse motor comprising a rotor having a plurality of sets of armature members spaced around the axis thereof, a stator having a plurality of field magnets each having two pole portions, the two pole portions of each field magnet having face portions located at the sides of one portion of the path of one set of armature members, each of said field magnets having a winding for oppositely magnetizing the pole portions thereof, at least one of the pole portions of each of said field magnets having a plurality of poles with an angular spacing correlated to that of said armature members, and the angular spacing between the sets of poles of different field magnets being different from the angular spacing between the different sets of armature members, said motor being so constructed and arranged that after the armature members have been drawn to the position they tend to assume upon energization of one winding, energization of another winding will cause them to move in a predetermined direction.

3. An electric impulse motor comprising a rotor having two sets of armature members spaced around the axis thereof, all of the armature members of each set being similarly located with respect to the axis of the motor but the sets being spaced from each other, and a stator having two field magnets each having two pole portions, the two pole portions of each field magnet having face portions located at the sides of one portion of the path of one set of armature members, each of said field magnets having a winding for magnetizing the pole portions thereof, each of the pole portions of said field magnets having one pole for each armature member of the set associated therewith and the angular spacing between the poles on one field magnet and the poles on the other field magnet being equal to the angular spacing between the two sets of armature members plus half of the angular spacing between the successive armature members of one set, said motor being so constructed and arranged that after the armature members have been drawn to the position they tend to assume upon energization of one winding, energization of another winding will cause them to move in a predetermined direction.

4. An electric impulse motor comprising a rotor having a plurality of sets of armature members spaced around the axis thereof, a stator having a plurality of field magnets each having two pole portions, the two pole portions of each field magnet having face portions located at the sides of one portion of the path of one set of armature members, at least one of the pole portions of each field magnet having a plurality of poles with an angular spacing correlated to that of said armature members, each of said field magnets having a winding for magnetizing the pole portions thereof, the armature members of each set being spaced, with respect to its cooperative field pole portions, differently at any instant than the spacing of the armature pole faces of any other set with respect to its cooperative field pole portions, and means for sending current impulses successively through different windings of said field magnets, said motor being so constructed and arranged that after the armature members have been drawn to the position they tend to assume upon energization of one winding, energization of another winding will cause them to move in a predetermined direction.

5. An electric impulse motor comprising a rotor having two sets of armature members spaced around the axis thereof, a stator having two field magnets, each having two pole portions, the two pole portions of each field magnet having face portions located on different sides of one portion of the path of one set of armature members, each of said field magnets having a winding for magnetizing the pole portions thereof and having a plurality of poles with an angular spacing correlated to that of said armature members, a source of direct current, and means for connecting said source alternately to the windings of said field magnets, said motor being so constructed and arranged that after the armature members have been drawn to the position they tend to assume upon energization of one winding, energization of another winding will cause them to move in a predetermined direction.

6. An electric impulse motor comprising a rotor having two sets of armature members spaced around the axis thereof, a stator having two field magnets, each having two pole portions, the two pole portions of each field magnet having face portions located on different sides of one portion of the path of one set of armature members, each of said field magnets having a winding for magnetizing the pole portions thereof and having a plurality of poles with an angular spacing correlated to that of said armature members, a source of alternating current, and connections from said source to the winding of each of said field magnets, the connection to each winding including a rectifier, and said rectifiers being oppositely arranged so that current flows alternately through said windings, said motor being so constructed and arranged that after the armature members have been drawn to the position they tend to assume upon energization of one winding, energization of another winding will cause them to move in a predetermined direction.

7. An electric impulse motor comprising a magnetizable cup-like stator member having a central stem and having spaced opposed poles projecting radially in from the rim thereof and radially out from said stem, a coil on said stem, a second similar stator member and coil coaxial with and facing said first stator member and coil, a rotatable non-magnetic disc coaxial with and located between said stator members, and armature pieces fixed to both sides of one portion of said disc and projecting into the spaces between the opposed poles of both of said stator members, the angular spacing of the pairs of opposed poles on each stator member and of the armature pieces on each side of said disc being correlated, and the poles on one stator member being angularly offset, with respect to its cooperative armature pieces, from the poles on the other stator member an angular distance equal to half of said angular spacing, said motor being so constructed and arranged that after the armature members have been drawn to the position they tend to assume upon energization of one winding, energization of another winding will cause them to move in a predetermined direction.

8. An electric impulse motor comprising a magnetizable stator member having coaxial inner and outer longitudinally extending portions joined into a magnetic circuit at one end and having circumferentially spaced poles projecting from the other end of one of said portions, a coil on said inner portion, a second similar stator member and coil coaxial with and facing said first stator member and coil, and a rotor coaxial with and located between said stator members, said rotor having circumferentially spaced armature portions positioned to pass across the lines of magnetic flux between said stator portions as said rotor turns, the lateral faces of said poles and said armature portions being inclined with respect to said lines of magnetic flux.

9. An electric impulse motor comprising a magnetizable stator member having co-axial inner and outer longitudinally extending portions joined into a magnetic circuit at one end, said outer portion having circumferentially spaced poles projecting towards the end of the inner portion, a coil on said inner portion, a second similar stator member and coil coaxial with and facing said first stator member and coil, and a rotor coaxial with and located between said stator members, said rotor having circumferentially spaced armature portions projecting between said inner stator portions and said stator poles, the lateral faces of said poles and said armature portions being inclined with respect to lines radial to said axis.

10. An electric impulse motor comprising a magnetizable stator member having coaxial inner and outer longitudinally extending portions joined into a magnetic circuit at one end, said inner portion having circumferentially spaced poles, a coil on said inner portion, a second similar stator member and coil coaxial with and facing said first stator member and coil, and a rotor coaxial with and located between the ends of said inner portions and within the ends of said outer portions, said rotor having circumferentially spaced armature portions positioned to form paths for magnetic flux between said poles and the ends of said outer portions, the circumferentially facing sides of the two sets of poles being oppositely inclined with respect to the axis of said rotor and the circumferentially facing sides of said armature portions being similarly oppositely inclined at the two sides of a central radial plane.

11. An electric impulse motor comprising a field magnet having two coaxial pole portions and a coil for oppositely magnetizing said pole portions, each of said pole portions having circumferentially spaced poles paired with poles on the other pole portion, each pair of poles having the sides thereof that face circumferentially in one direction lying in the same axial plane and having the opposite sides offset from each other, a second similar field magnet coaxial with the first field magnet and spaced axially therefrom, and a rotor having two sets of armature members fixed thereto, each of said sets of armature members projecting between the poles of one of said field magnets, the angular spacing of said armature members and said poles being correlated and the angular relation of the two sets of armature members and the poles of the two field magnets being such that the armature members of one set lie directly between the poles of one field magnet while the armature members of the other set lie half way between two such positions.

12. A magnetic-electric device, comprising a rotor including a disk of non-magnetic material and having a plurality of armature members of magnetic material carried thereby and spaced around the axis thereof the space annularly therebetween being non-magnetic, and a stator having two face portions located at the sides of one portion of the path of said armature members and having a winding for oppositely magnetizing said portions, at least one of said stator portions having a plurality of poles with an angular spacing correlated to that of said armature members.

13. An electric impulse motor comprising a magnetizable cup-like stator member having a central stem and having spaced opposed poles projecting radially in from the rim thereof and radially out from said stem, a coil on said stem, a second similar stator member and coil coaxial with said first stator member and coil, a rotatable non-magnetic disc coaxial with and located between said stator members, and permanently magnetized armature pieces fixed to both sides of said disc and projecting into the spaces between the opposed poles of both of said stator members, said motor being so constructed and arranged that after the armature members have been drawn to the position they tend to assume upon energization of one coil, energization of another coil will cause them to move in a predetermined direction.

14. A magnetic-electrical device including a rotor having a plurality of sets of circumferentially spaced armature members thereon, the angular spacing of circumferentially adjacent members being substantially uniform throughout, and stator means including magnetic means forming magnetic circuits through each of said sets, the magnetic means in each path including pole portions forming an air gap therebetween in which one of said sets rotates, and at least one of the pole portions adjacent each set being sub-divided into separate poles having an angular spacing correlated to that of the armature portions, the angular relationship between the sets and the poles adjacent thereto being such that when one set lies closest to its adjacent poles, the other armature members considered collectively lie approximately midway between their cooperative poles circumferentially; and coil means surrounding a portion of each magnetic circuit to cooperate with the rotor and spaced poles in said circuit; a part of each of said magnetic circuits being formed of a permanent magnet.

15. A magnetic-electrical device including a rotor having a plurality of sets of circumferentially spaced armature members thereon, the angular spacing of circumferentially adjacent members being substantially uniform throughout, and stator means including magnetic means forming magnetic circuits through each of said sets, the magnetic means in each path including pole portions forming an air gap therebetween in which one of said sets rotates, and at least one of the pole portions adjacent each set being sub-divided into separate poles having an angular spacing correlated to that of the armature portions, the angular relationship between the sets and the poles adjacent thereto being such that when one set lies closest to its adjacent poles, the other armature members considered collectively lie approximately midway between their cooperative poles circumferentially; and coil means surrounding a portion of each magnetic circuit to cooperate with the rotor and spaced poles in said circuit.

16. A magnetic-electrical device including a rotor having a plurality of sets of circumferentially spaced armature members thereon, the angular spacing of circumferentially adjacent members being substantially uniform throughout, and stator means including magnetic means forming magnetic circuits through each of said sets, the magnetic means in each path including pole portions forming an air gap therebetween in which one of said sets rotates, and at least one of the pole portions adjacent each set being sub-divided into separate poles having an angular spacing correlated to that of the armature portions, the angular relationship between the sets and the poles adjacent thereto being such that when one set lies closest to its adjacent poles, the other armature members considered collectively lie approximately midway between their cooperative poles circumferentially; and coil means surrounding the rotor axis and a portion of each magnetic circuit to cooperate with the rotor and spaced poles in said circuit.

17. An electric impulse motor comprising a rotor having a plurality of sets of armature pole faces spaced around the axis thereof, a stator having a plurality of field magnets each having two pole portions, the two pole portions of each field magnet having face portions located at the sides of one portion of the path of one set of armature pole faces, at least one of the pole portions of each field magnet having a plurality of poles with an angular spacing correlated to that of said armature pole faces, each of said field magnets having a winding for magnetizing the pole portions thereof, the armature pole faces of each set being spaced, with respect to its cooperative field pole portions, differently at any instant than the spacing of the armature pole faces of any other set with respect to its cooperative field pole portions, and means for sending current impulses successively through different windings of said field magnets, said motor being so constructed and arranged that after the armature members have been drawn to the position they tend to assume upon energization of one winding, energization of another winding will cause them to move in a predetermined direction.

18. An electric impulse motor comprising a rotor havying a plurality of sets of armature pole faces spaced around the axis thereof, a stator having a plurality of field magnets each having two pole portions, the two pole portions of each field magnet having face portions located at the sides of one portion of the path of one set of armature pole faces, at least one of the pole portions of each field magnet having a plurality of poles with an angular spacing correlated to that of said armature pole faces, each of said field magnets having a winding for magnetizing the pole portions thereof, the armature pole faces of each set being spaced, with respect to its cooperative field pole portions, differently at any instant than the spacing of the armature pole faces of any other set with respect to its cooperative field pole portions, means for sending current impulses successively through different windings of said field magnets, and shading coils adjacent air gaps between the poles and face portions and each surrounding one part of the magnetic path on one side of said gap.

19. A magnetic-electrical device including a rotor having a plurality of sets of circumferentially spaced armature pole faces thereon, and stator means including magnetic means forming magnetic circuits through each of said sets, the magnetic means in each path including pole portions forming an air gap therebetween in which one of said sets rotates, and at least one of the pole portions adjacent each set being sub-divided into separate poles having an angular spacing correlated to that of the pole faces, the angular relationship between the sets and the poles adjacent thereto being such that when one set lies closest to its adjacent poles, the other pole faces considered collectively lie approximately midway between their cooperative poles circumferentially; and coil means surrounding a portion of each magnetic circuit to cooperate with the rotor and spaced poles in said circuit, a part of each of said magnetic circuits being formed of a permanent magnet.

20. A magnetic-electrical device including a rotor having a plurality of sets of circumferentially spaced armature pole faces thereon, and stator means including magnetic means forming magnetic circuits through each of said sets, the magnetic means in each path including pole portions forming an air gap therebetween in which one of said sets rotates, and at least one of the pole portions adjacent each set being sub-divided into separate poles having an angular spacing correlated to that of the pole faces, the angular relationship between the sets and the poles adjacent thereto being such that when one set lies closest to its adjacent poles, the other pole faces considered collectively lie approximately midway between their cooperative poles circumferentially; and coil means surrounding a portion of each magnetic circuit to cooperate with the rotor and spaced poles in said circuit.

EMIL L. RANSEEN.